US009107033B2

(12) United States Patent
An et al.

(10) Patent No.: US 9,107,033 B2
(45) Date of Patent: Aug. 11, 2015

(54) SYSTEM AND METHOD FOR MANAGING SENSOR NODE IN RFID/USN INFRASTRUCTURE AND GATEWAY SYSTEM USED THEREFOR

(75) Inventors: Sun-Shin An, Seoul (KR); Sang-Bin Lee, Seoul (KR); Sung-Jun Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 856 days.

(21) Appl. No.: 13/255,395

(22) PCT Filed: Jan. 11, 2010

(86) PCT No.: PCT/KR2010/000168
§ 371 (c)(1),
(2), (4) Date: Nov. 23, 2011

(87) PCT Pub. No.: WO2010/104267
PCT Pub. Date: Sep. 16, 2010

(65) Prior Publication Data
US 2012/0057581 A1 Mar. 8, 2012

(30) Foreign Application Priority Data

Mar. 13, 2009 (KR) ........................ 10-2009-0021775

(51) Int. Cl.
*H04W 4/00* (2009.01)
*H04W 8/02* (2009.01)
*H04L 29/08* (2006.01)
*H04W 8/26* (2009.01)
*H04W 60/00* (2009.01)

(52) U.S. Cl.
CPC ............... *H04W 8/02* (2013.01); *H04L 67/125* (2013.01); *H04W 8/26* (2013.01); *H04W 60/00* (2013.01)

(58) Field of Classification Search
None
See application file for complete search history.

(56) References Cited

U.S. PATENT DOCUMENTS

| 7,062,270 B1* | 6/2006 | Dalvie et al. .................. 455/433 |
| 2006/0190458 A1* | 8/2006 | Mishina et al. ................. 707/10 |
| 2006/0271661 A1* | 11/2006 | Qi et al. ........................ 709/223 |
| 2007/0060147 A1 | 3/2007 | Shin et al. |
| 2008/0062917 A1* | 3/2008 | Oguchi ......................... 370/328 |
| 2008/0136708 A1 | 6/2008 | Kim et al. |

FOREIGN PATENT DOCUMENTS

| KR | 10-0827367 B1 | 5/2008 |
| WO | WO 2006/049374 A1 | 5/2006 |

OTHER PUBLICATIONS

International Search Report and Written Opinion for International Application No. PCT/KR2010/000168, mailed Aug. 30, 2010.

\* cited by examiner

*Primary Examiner* — Kodzovi Acolatse
(74) *Attorney, Agent, or Firm* — Alston & Bird LLP (57) ABSTRACT

A sensor node management system in a Radio Frequency Identification/Ubiquitous Sensing Network (RFID/USN) infrastructure is provided, in which a sensor node has a local ID in a sensor network, a gateway receives, from the sensor node, node information including the local ID and an ID of a home gateway to which the sensor node initially belongs and registers the node information about the sensor node to a location information server, and the location information server registers and manages node information about sensor nodes within an area of the gateway. The location information server generates a global ID using the local ID and the ID of the home gateway, the global ID being recognized as an address of the sensor node by an Internet Protocol (IP) network.

17 Claims, 7 Drawing Sheets

| field | Description |
|---|---|
| SID | RFID/Sensor Local ID |
| H-GW | HOME GATEWAY ID |
| CMD | FIELD INDICATING REGISTRATION PACKET FOR REQUESTING REGISTRATION |
| Event | FIELD INDICATING EVENT IN WHICH REGISTRATION REQUEST IS ISSUED |
| type | SENSOR TYPE PROVIDED IN RFID/SENSOR NODE |
| Value | SENSED VALUE AND LOCATION VALUE OF SENSOR |
| hop | NUMBER OF HOPS FROM CURRENT GW |

| GW ID | GW IP |
|---|---|
| 0x0001 | 163.152.27.112 |

| Local Address (RFID/Sensor Network) | Global Address |
|---|---|
| (RFID/Sensor ID) 0x0001 | (Gateway IP + Port) 163.152.27.112/1 |
| (RFID/Sensor ID) 0x0002 | (Gateway IP + Port) 163.152.27.112/2 |
| (RFID/Sensor ID) 0x0003 | (Gateway IP + Port) 163.152.27.112/3 |

SYSTEM AND METHOD FOR MANAGING SENSOR NODE IN RFID/USN INFRASTRUCTURE AND GATEWAY SYSTEM USED THEREFOR

CROSS REFERENCE TO RELATED APPLICATIONS

This application is a national stage application filed under 35 U.S.C. 371 of International Application No. PCT/KR2010/000168, filed Jan. 11, 2010, which claims priority from Korean Application No. 10-2009-0021775, filed Mar. 13, 2009, each of which is incorporated herein in its entirety.

TECHNICAL FIELD

The present invention generally relates to a technique for managing an RFID/sensor node in an open Radio Frequency Identification/Ubiquitous Sensor Network (RFID/USN) infrastructure. More particularly, the present invention relates to a system and method for increasing energy efficiency for interaction between a sensor network and an Internet Protocol (IP) network, enabling use of an appropriate protocol according to network characteristics, and ensuring the mobility of an RFID/sensor node, and a gateway system used therefor.

BACKGROUND ART

A sensor network technology that senses and controls an external human environment has recently emerged as a core technology. That is, a USN has attracted attention to sense objects and environments by attaching electronic tags to all objects and build and utilize real-time information about the objects and environments over a network. The USN has evolved from its initial stage of identifying an entity using an electronic tag through a stage of acquiring environmental information simultaneously by adding a sensing function to a stage of controlling tags by configuring an ad-hoc network so that tags may communicate with one another. Further, the recent years have witnessed the development of the USN toward an IP-USN in which one or more IP-based sensor nodes are networked. It is expected that the USN will be developed more rapidly.

In fact, the information and communication infrastructure policy working group of the Ministry of Information and Communication reported that the global market of the USN would grow from about 600 million dollars in 2006 to about 12.8 billion dollars in 2012, representing an annual growth of 66%. The domestic market of the USN is expected to grow 71% annually, starting from 2008, the year when USN services were actually deployed, and thus reach 2,100 billion wons in 2012.

A sensor network is considered to be a base technology for constructing a ubiquitous computing environment. The sensor network includes an RFID/sensor node being a small-size radio transceiver equipped with sensing and communication functions, a sink node for collecting sensed information from the sensor node or transferring event data to an external device, and a reference node for transmitting its current location information to a neighbor node with a predetermined power at every predetermined interval. Compared to a conventional network, this sensor network basically seeks to collect remote information automatically, not to communicate. As a core technology of the ubiquitous environment, the sensor network finds its applications in a wide range of fields including target tracking, environment monitoring, traffic information management, logistics management, etc. and it also has potentials to be applied to many other fields.

However, a current sensor network that operates in compliance with Institute of Electrical and Electronics Engineers (IEEE) 802.15.4 Low Rate-Wireless Personal Area Network (LR-WPAN) and ZigBee standards uses an independent 16-bit or 64-bit address system as the address of an RFID/sensor node, instead of an IP address. Hence, the current sensor network is configured as a stand-alone network without being connected to an IP network.

The 6LoWPAN standard was developed as one of approaches to interaction between the Internet and the RFID/sensor network. However, this technology requires an IP version 6 (IPv6) layer and a 6LowWPAN adaptation layer in an RFID/sensor node having resource-limited characteristics such as the requirements of low energy, low processing power, low data rate, etc. The resulting large processing load leads to increased energy consumption.

DISCLOSURE OF INVENTION

Technical Problem

An aspect of exemplary embodiments of the present invention is to address at least the problems and/or disadvantages and to provide at least the advantages described below. Accordingly, an aspect of exemplary embodiments of the present invention is to provide a system for managing an RFID/sensor node in an RFID/USN infrastructure, which increases energy efficiency for interaction between a sensor network and an IP network, which enables use of an appropriate protocol according to network characteristics, and which ensures the mobility of the sensor node.

Another aspect of exemplary embodiments of the present invention provides a method for managing an RFID/sensor node in an RFID/USN infrastructure, which increases energy efficiency for interaction between a sensor network and an IP network, which enables use of an appropriate protocol according to network characteristics, and which ensures the mobility of the sensor node.

A further aspect of exemplary embodiments of the present invention provides a gateway system used for the sensor node management system and method.

Solution to Problem

In accordance with an aspect of exemplary embodiments of the present invention, there is provided a sensor node management system in an RFID/USN infrastructure, in which a sensor node has a local ID in a sensor network, a gateway receives, from the sensor node, node information including the local ID and an ID of a home gateway to which the sensor node initially belongs and registers the node information about the sensor node to a location information server, and the location information server registers and manages node information about sensor nodes within an area of the gateway. The location information server generates a global ID using the local ID and the ID of the home gateway, the global ID being recognized as an address of the sensor node by an Internet Protocol (IP) network.

The location information server may include a home location information server for registering and managing node information about a sensor node for which the gateway is a home gateway, and a visiting location information server for registering and managing node information about a visiting sensor node which has moved to the area of the gateway.

If the sensor node is a visiting sensor node that has moved to the area of the gateway, the visiting location information server may transmit the node information about the sensor node to a home location information server of the home gateway of the sensor node.

The global ID may include a port count of the sensor node and an IP address of the home gateway.

The gateway may broadcast a node information request to sensor nodes in the area of the gateway and the sensor node may receive the node information request and transmit the node information to the gateway.

The gateway may transmit a data request packet received from a user host of the IP network to the sensor node using the global ID and transmit a sensed data packet received from the sensor node to the user host using the global ID.

When data is transmitted between the sensor node and the IP network, the location information server may perform address translation by translating a local ID or global ID of a data packet to a global ID or local ID.

The location information server may perform the address translation using an address translation table in which the local ID of the sensor node is mapped to the global ID of the sensor node.

The location information server may include an address translation table manager for updating the address translation table, an address translator for performing the address translation on the data request packet or the sensed data packet using the address translation table, and a protocol processor for processing the data request packet or the sensed data packet according to a protocol of the sensor network or the IP network.

In accordance with another aspect of exemplary embodiments of the present invention, there is provided a gateway system used for interaction between a sensor network and an IP network, in which a gateway requests to a sensor node having a local ID in the sensor network, node information including the local ID and an ID of a home gateway to which the sensor node initially belongs, and registers the node information about the sensor node to a location information server, and the location information server registers and manages node information about sensor nodes within an area of the gateway. The location information server includes a home location information server for registering and managing node information about a sensor node for which the gateway is a home gateway, and a visiting location information server for registering and managing node information about a visiting sensor node which has moved to the gateway, and the location information server generates a global ID using the local ID and the ID of the home gateway, the global ID being recognized as an address of the sensor node by the IP network.

In accordance with a further aspect of exemplary embodiments of the present invention, there is provided a sensor node management method in an RFID/USN infrastructure, in which node information registration is performed by receiving from a sensor node having a local ID in a sensor network node information including the local ID and an ID of a home gateway to which the sensor node initially belongs by a gateway, and registering the node information about the sensor node to a location information server that manages node information about sensor nodes within an area of the gateway by the gateway, and node information management is performed by generating a global ID using the local ID and the ID of the home gateway by the location information server, the global ID being recognized as an address of the sensor node by an IP network.

Advantageous Effects of Invention

As is apparent from the above description of the present invention, a gateway connecting a sensor network to an IP network performs an address translation between network addresses. Thus the networks interact with each other efficiently and node information is efficiently managed.

Also, since the gateway performs a process for the interaction between the networks, both the sensor network and the IP network can use independent protocols according to their characteristics.

Further, the mobility of an RFID/sensor node is ensured, thereby achieving the effect of Mobile IP.

BRIEF DESCRIPTION OF DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

MODE FOR THE INVENTION

Before making a detailed description of the present invention, a technical outline of the present invention will first be presented for helping a better understanding of the present invention.

With the aims of efficient node information management and interaction between a sensor network and an Internet Protocol (IP) network, for example, between a Radio Frequency Identification (RFID)/sensor network and an RFID/Ubiquitous Sensor Network (USN) infra-network using Transmission Control Protocol (User Datagram Protocol)/IP (TCP (UDP)/IP), a gateway system (u-GW) connecting the sensor network to the IP network registers and manages node information about an RFID/sensor node and translates the addresses of the sensor network and the IP network to each other, thereby enabling data exchange between the sensor network and the IP network according to the present invention.

Now, preferred embodiments of the present invention will be described in detail with reference to the accompanying drawings. In the following description, a variety of specific elements such as constituent elements are shown. The description of such elements has been made only for a better understanding of the present invention. Those skilled in the art will appreciate that various modifications, additions, and substitutions to the specific elements are possible, without departing from the scope and spirit of the invention as disclosed in the accompanying claims. In the following description of the present invention, a detailed description of known functions and configurations incorporated herein will be omitted when it may obscure the subject matter of the present invention. Also, the terms used in the following description are terms defined taking into consideration the functions obtained in accordance with the present invention. The definitions of these terms should be determined based on the whole content of this specification because they may be changed in accordance with the option of a user or chip designer or a usual practice FIG. 1 illustrates an open RFID/USN infrastructure to which the present invention is applicable.

Figure 1:
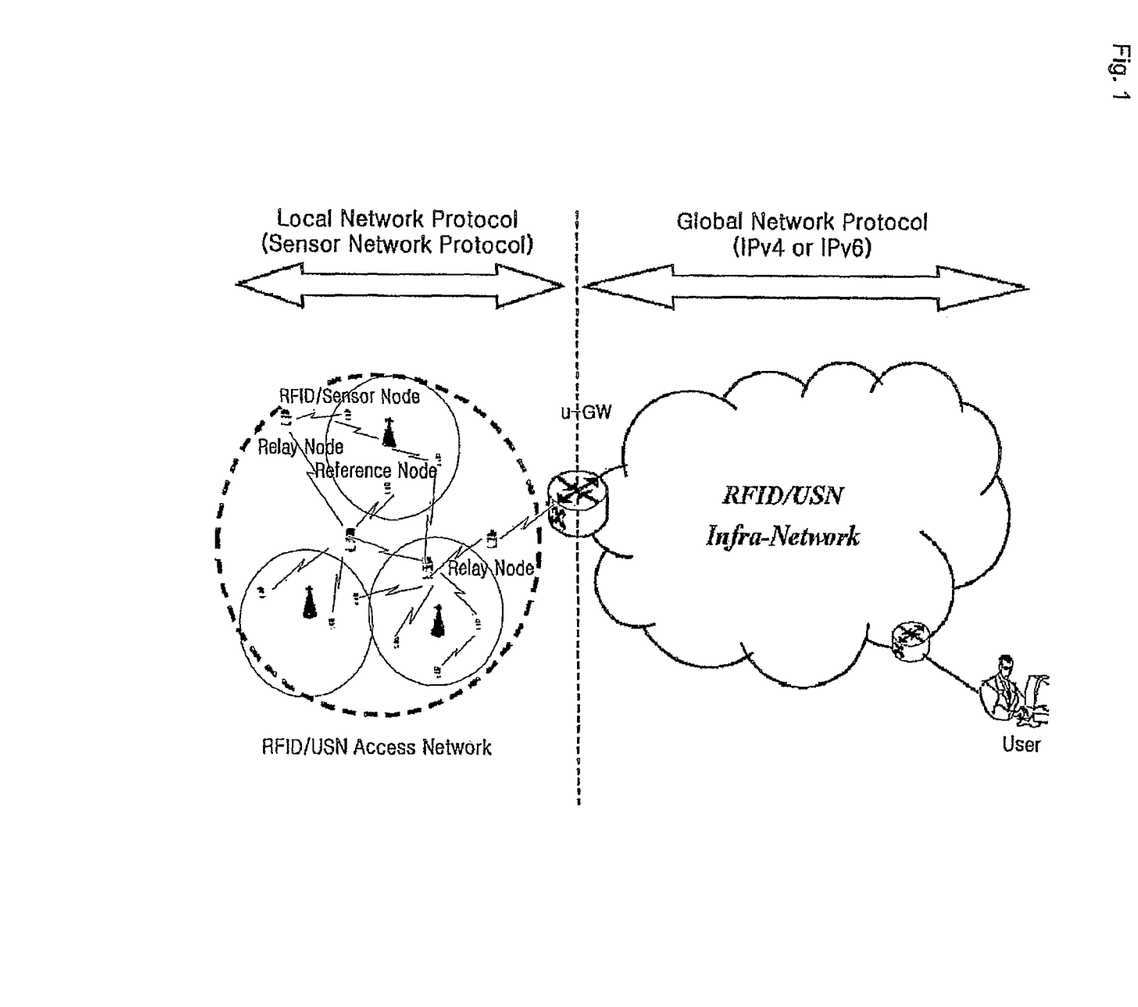
FIG. 1 illustrates an open RFID/USN infrastructure to which the present invention is applicable.

Referring to FIG. 1, the open RFID/USN infrastructure provides services to users over an RFID/USN access network. The RFID/USN access network includes an RFID/sensor node, a reference node, and a relay node. Each of the nodes has different information (e.g. a node-specific ID, a node type, sensed data, RFID tag data, a node position, etc.), which may be changed in real time.

Figure 2:
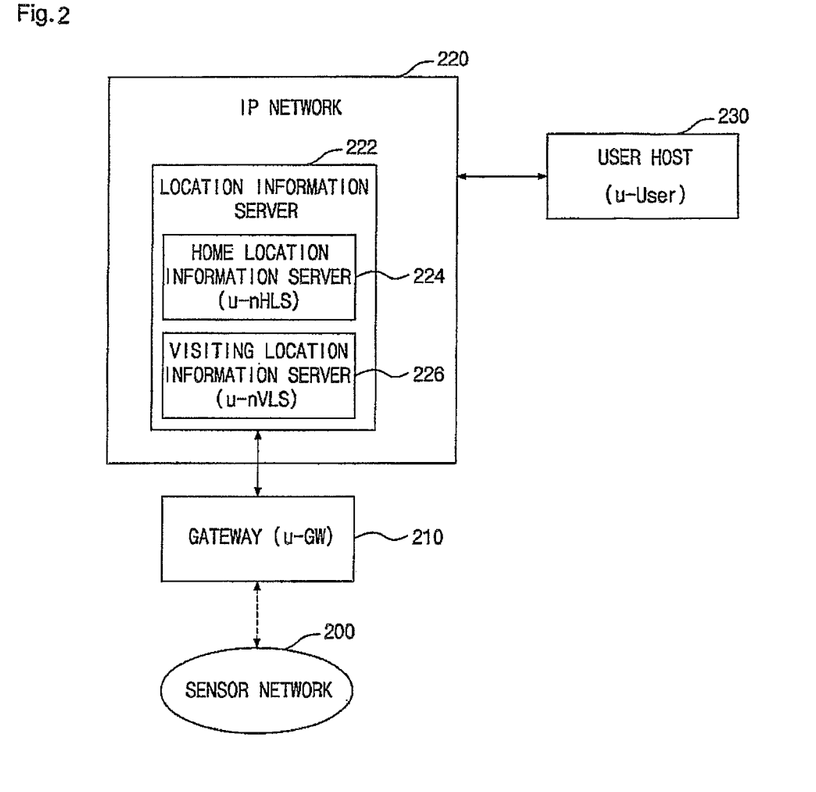
FIG. 2 is a block diagram of an RFID/sensor node management system in the RFID/USN infrastructure according to an exemplary embodiment of the present invention.
Figure 3:
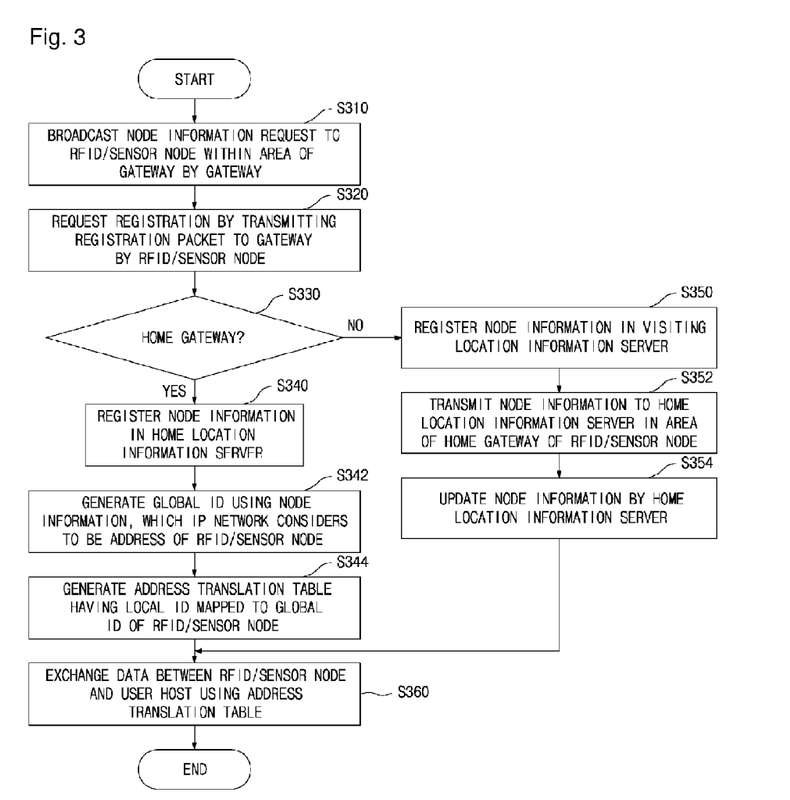
FIG. 3 is a flowchart illustrating an RFID/sensor node management method in the RFID/USN infrastructure according to an exemplary embodiment of the present invention.

FIG. 2 is a block diagram of an RFID/sensor node management system in the RFID/USN infrastructure according to an exemplary embodiment of the present invention, and FIG. 3 is a flowchart illustrating an RFID/sensor node management method in the RFID/USN infrastructure according to an exemplary embodiment of the present invention.

Referring to FIGS. 2 and 3, the sensor node management system according to the exemplary embodiment of the present invention includes an RFID/sensor node having a local ID in a sensor network 200, a gateway 210 that connects the sensor network 200 to an IP network 220, and a location information server 222 that registers and manages node information about the sensor node.

The gateway 210 broadcasts a node information request to an RFID/sensor node in the area of the gateway 210 to register node information about the sensor node in step S310. Upon receipt of the node information request, the sensor node requests registration by transmitting node information including the local ID of the sensor node and the ID of a home gateway to which the sensor node initially belonged to the gateway 210 in step S320.

The gateway 210 registers the node information about the sensor node to the location information server 222 that registers and manages the node information about sensor nodes in the area of the gateway 210 in step S340 or S350.

The location information server 222 includes a home location information server 224 for registering and managing node information about sensor nodes for which the gateway 210 is a home gateway, and a visiting location information server 226 for registering and managing node information sensor nodes that have visited to the area of the gateway 210.

If the gateway 210 is a home gateway for the sensor node in step S330, the gateway 210 registers the node information about the sensor node to the home location information server 224 in step S340.

On the other hand, if the gateway 210 is not a home gateway for the sensor node 210 in step S330, the gateway 210 registers the node information about the sensor node to the visiting location information server 226.

Figure 4:
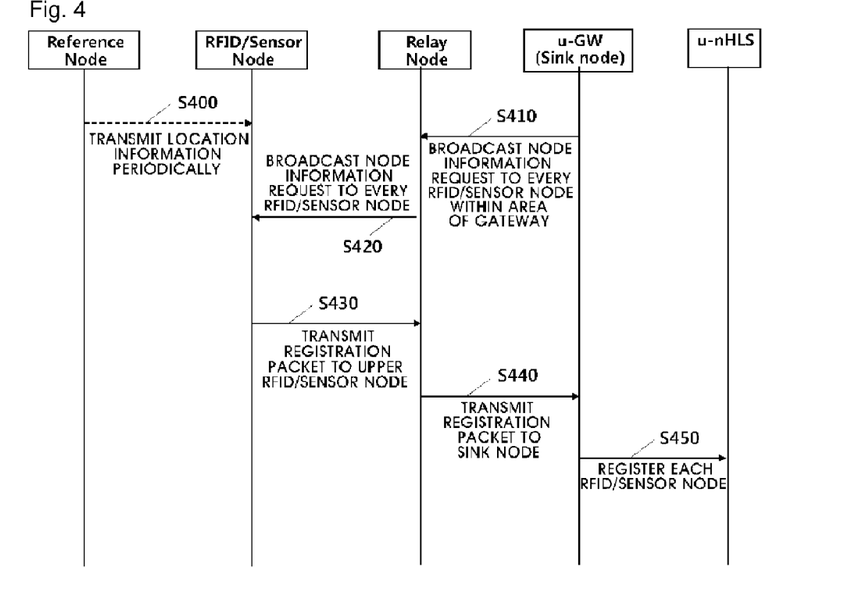
FIG. 4 is a diagram illustrating a signal flow for a procedure for registering node information according to an exemplary embodiment of the present invention.

FIG. 4 is a diagram illustrating a signal flow for a procedure for registering node information according to an exemplary embodiment of the present invention.

Referring to FIG. 4, the reference node of the sensor network 200 periodically transmits its location information to neighbor RFID/sensor nodes in step S400. Only when the gateway 210 requests node information, the node information is initially registered in steps S410 and S420. Upon receipt of the node information request from the gateway 210 via a relay node, RFID/sensor nodes within the area of the gateway 210 replies to the gateway 210 by transmitting registration packets including their node information in steps S430 and S440. In step S450, the gateway 210 registers the node information about the RFID/sensor nodes received in the registration packets to the home location information server 224.

Figure 5:
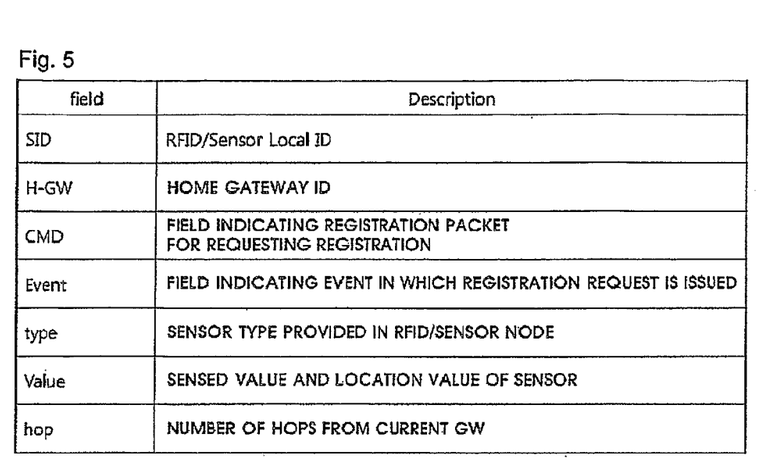
FIG. 5 illustrates a format of a registration packet by which an RFID/sensor node requests registration according to an exemplary embodiment of the present invention.

FIG. 5 illustrates a format of a registration packet by which an RFID/sensor node requests registration according to an exemplary embodiment of the present invention.

Referring to FIG. 5, a Home GateWay (H-GW) field may be set to '0' or an ID of a gateway to which the RFID/sensor node should initially belong. A hop field indicates the count of hops from the gateway 210, required for routing. Upon receipt of a node information request message from the gateway 210, if the H-GW field is 0, the RFID/sensor node determines the gateway 210 as its home gateway, sets the H-GW field accordingly, and transmits a registration packet with the H-GW field to the gateway 210. The RFID/sensor node considers the initial gateway as its home gateway until before receiving a home gateway change request from the gateway 210 due to a system change or any other factor. Even when the sensor node is reset, the HG-W field value is maintained. Besides, the RFID/sensor node registers information about a node ID, a node type (e.g. an RFID node, an RFID/sensor node, a relay node, a reference node, etc.), a sensing type (e.g. temperature, illuminance, humidity, pressure, etc.), a current location, the number of hops to a current gateway, etc. An Event field indicates an event in which the registration request has been issued, such as initialization, reset, location change, etc.

Meanwhile, if the gateway 210 is not a home gateway for the RFID/sensor node, that is, the gateway 210 is a visiting gateway for the RFID/sensor node in step S330, the gateway 210 registers the node information about the RFID/sensor node to the visiting location information server 226 in step S340.

Figure 6:
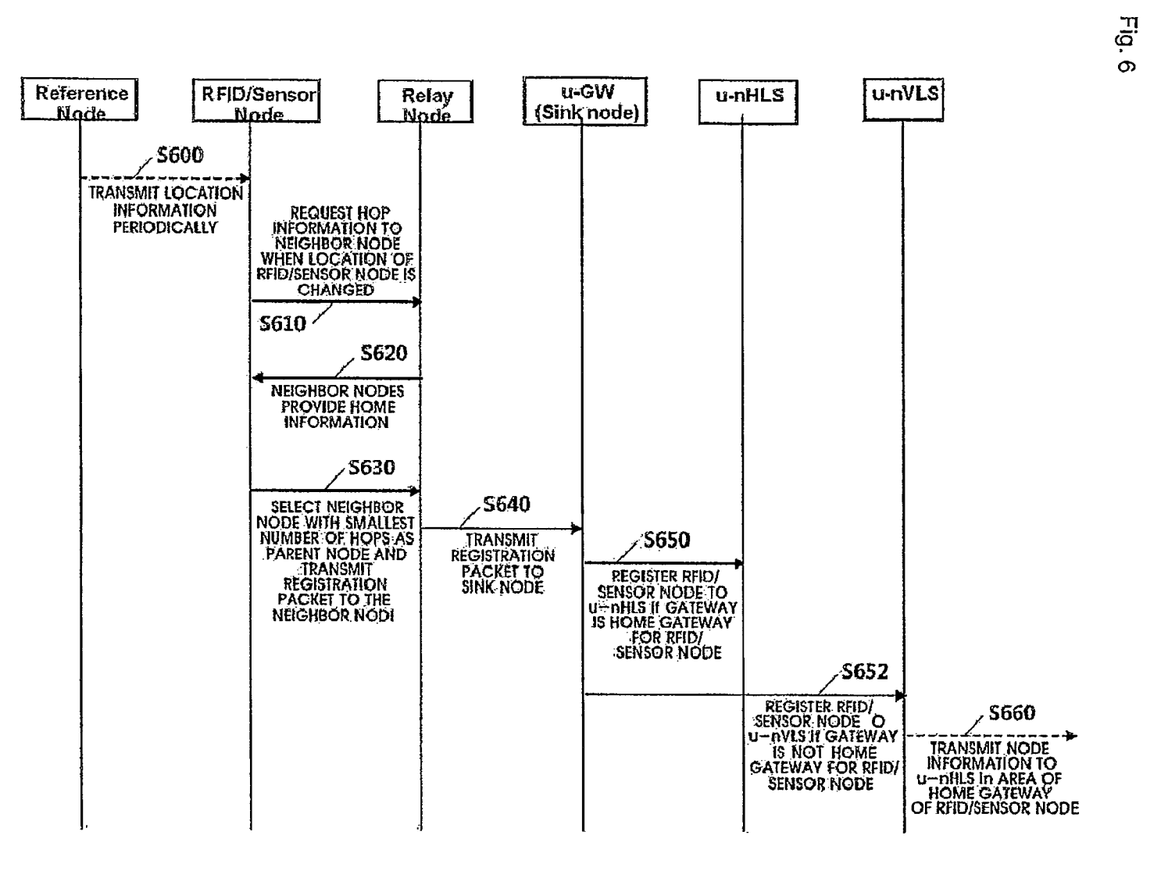
FIG. 6 is a diagram illustrating a signal flow for a registration operation when the sensor node moves or is reset according to an exemplary embodiment of the present invention.

FIG. 6 is a diagram illustrating a signal flow for a registration operation when an RFID/sensor node moves or is reset.

Referring to FIG. 6, a reference node periodically transmits its location information to a neighbor RF/sensor node in the sensor network 200 in step S600. If the RFID/sensor node is to register node information through a gateway in an area to which it has moved, it has to know the number of hops to the gateway, for routing. As the RFID/sensor node moves, the number of hops to the previous gateway is also changed and thus the RFID/sensor node should find out the number of hops from neighbor nodes. Therefore, when the location field value of the registration packet has been changed, the RFID/sensor node asks neighbor nodes the numbers of hops of the neighbor nodes and awaits reception of responses from the neighbor nodes in step S610. The neighbor nodes that the RFID/sensor node asks may include the gateway (sink node). Upon receipt of hop information from neighbor nodes in step S620, the RFID/sensor node selects a neighbor node that has the smallest number of hops and transmitted the hop information earliest to the RFID/sensor node, determines the selected neighbor node as its parent node (upper node), and sets the number of hops for the RFID/sensor node to (the number of hops of the parent node+1). Then the RFID/sensor node registers its node information to the current gateway through the parent node in steps S630 to S652. For this purpose, upon receipt of a query about hop information from a neighbor node, each RFID/sensor node should notify the neighbor node of the number of hops of the RFID/sensor node. When receiving a registration packet from the neighbor node, the RFID/sensor node should transmit the registration packet to its parent node. If the RFID/sensor node is reset or moves to the area of its home gateway, the RFID/sensor node registers its node information to the home location information server of the gateway in step S650. If the current gateway is a visiting gateway, the RFID/sensor node registers its node information to the visiting location information server of the gateway in step S652. The visiting location information server transmits the registered node information about the visiting RFID/sensor node to the home location information server of the home gateway of the visiting sensor node, so that the home location information server may update the node information about the visiting RFID/sensor node in step S660.

If the neighbor node is yet to be initialized, routing is impossible and thus registration cannot be performed. Hence, the RFID/sensor node awaits reception of a node information request from the gateway for a predetermined time (e.g. an initialization time of the neighbor node) and attempts a registration request again.

After the node information about the RFID/sensor node is registered, the location information server 222 manages the registered information.

When the node information about the RFID/sensor node is registered to the home location information server 224 in step S340, the home location information server 224 generates a global ID using the local ID set in the node information and the home gateway ID in step S342. The global ID is considered to be the address of the RFID/sensor node by the IP network. In an exemplary embodiment, the home location information server 224 may generate an address translation table having the local IDs of sensor nodes mapped to global IDs in step S344. A global ID may include the port count of an RFID/sensor node and information about the IP address of the home gateway.

Figure 7:
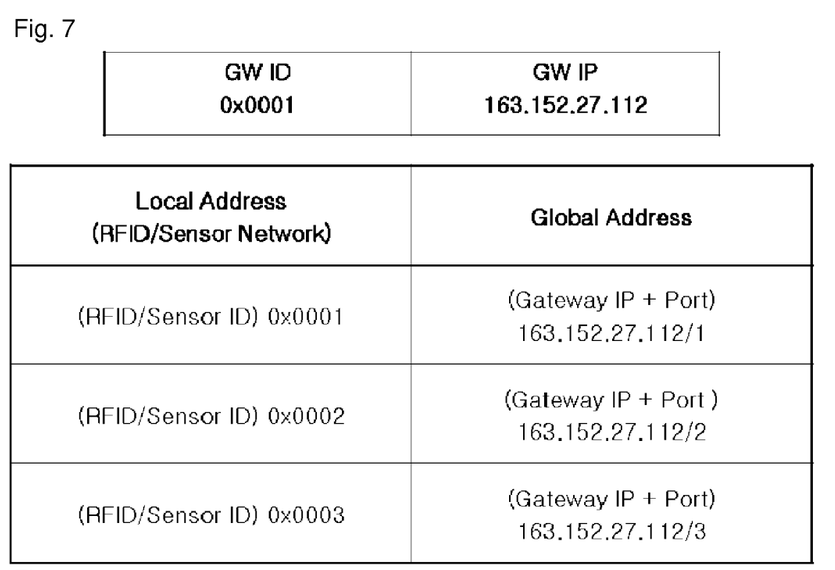
FIG. 7 illustrates an address translation table according to an exemplary embodiment of the present invention.

FIG. 7 illustrates an address translation table according to an exemplary embodiment of the present invention.

In the present invention, a local ID and a global ID are available to an RFID/sensor node. The local ID is the ID of the RFID/sensor node that is valid only in the RFID/USN network, for example. The global ID is the ID of the RFID/sensor node by which the RFID/sensor node is identified in the RFID/USN infra-network or all other networks. If the manufacturer of the RFID/sensor node or the network manager allocates a 16/64-bit address as the local ID, the 16/64-bit local ID (local address) of the RFID/sensor node and the home gateway ID are translated to the global ID in the form of the IP address of the home gateway+the port count of the RFID/sensor node.

Referring to FIG. 7, 163.152.27.112/3 is stored in the address translation table as the address of an RFID/sensor node with an ID of 0x0003 for which a home gateway has an ID of 0x0001 and an IP address of 163.152.27.112. However, the RFID/sensor node conducts communications, based on the ID (0x0001) of the gateway instead of the IP address (163.152.27.112) of the gateway.

As described later, the generation and use of the global ID enables interaction between networks and improves the efficiency of node information management. When the RFID/sensor node moves, the global ID has the same effect of a Mobile IP address by operating the home location information server 224 and the visiting location information server 226 in conjunction.

Further, due to the generation and use of a global ID in the form of the ID address of a home gateway+a port count, a local ID allocated to an RFID/sensor node in a home gateway may also be used for an RFID/sensor node in another home gateway, thereby increasing a local ID reuse factor. Needless to say, different local IDs should be allocated to different RFID/sensor nodes in the same home gateway. An RFID/sensor node to which a global ID is allocated can be regarded as a terminal with an IP address.

The gateway 210 may transmit a data request packet received from a user host 230 in the IP network to the RFID/sensor node and a data packet received from the RFID/sensor node to the user host 230, using the global ID of the RFID/sensor node in step S360. In this case, the home location information server 224 translates the local ID or global ID of the data packet to the global ID or the local ID, when transmitting data between the RFID/sensor node and the IP network. The address translation may be carried out referring to the address translation table.

To be more specific, the home location information server 224 manages the addresses and locations of nodes within the coverage area of the gateway 210.

The address of an RFID/sensor node is known to the RFID/USN infra-network or outside the RFID/USN infra-network, in the form of an IP address+port count as in TCP/IP. Thus the home location information server 224 in a gateway with the IP address recognizes the port count included in the global ID as the address of the RFID/sensor node in the RFID/sensor network and requests a response to the RFID/sensor node at the address. For this purpose, the home location information server 224 should perform the address translation function. To perform the address translation function, the home location information server 224 may have an address translation table.

Figure 8:
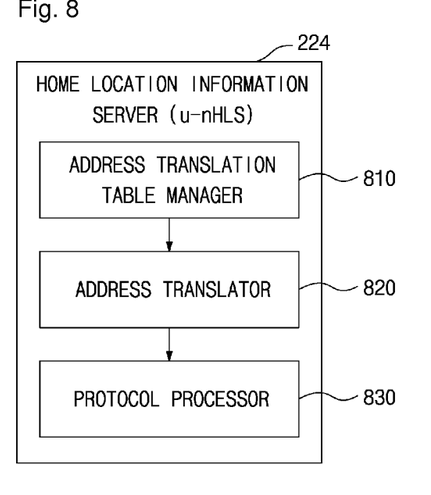
FIG. 8 is a block diagram illustrating a home location information server according to an exemplary embodiment of the present invention.

FIG. 8 is a block diagram illustrating a home location information server according to an exemplary embodiment of the present invention.

Referring to FIG. 8, the home location information server 224 includes an address translation table manager 810, an address translator 820, and a protocol processor 830.

The address translation table manager 810 is a module for adding, deleting, maintaining, modifying and managing the address translation table. The address translation table manager 810 translates the local ID of an RFID/sensor node to a global ID in the form of a TCP/IP address using registration packet information received through the gateway and stores the global ID in the address translation table. That is, the address translation table manager 810 may translate a gateway ID+an RFID/sensor node ID to a gateway IP address+a port count.

The address translator 820 performs the address translation for a data request packet received from the user host 230 or a sensed data packet received from the RFID/sensor node, referring to the address translation table. That is, the address translator 820 translates addresses between the RFID/USN network and the RFID/USN infra-network referring to the address translation table updated by the address translation table manager 810. For example, upon receipt of a data packet, the address translator 820 determines whether the data packet is from the sensor network or from the Internet. If the data packet is from the sensor network, the address translator 820 translates a local ID to a global ID taking the form of a TCP/IP address. On the other hand, in case of a TCP/IP packet, the address translator 820 translates a global ID to a local ID.

The protocol processor 830 processes the data request packet or the sensed data packet according to the protocol of the sensor network or the IP network and forwards the processed data packet to the sensor network or the IP network. The protocol processor 830 may include an RFID/sensor network protocol processor and an RFID/USN infra-network protocol processor.

Meanwhile, the visiting location information server 226 may be similar in configuration to the home location information server 224.

Notably, when the visiting location information server 226 registers node information about a visiting RFID/sensor node, the visiting location information server 226 transmits the node information to the home location information server 224 in step 352 and the home location information server 224 updates the node information in step 354. That is, when the visiting location information server 226 in each gateway registers an RFID/sensor node for which the gateway is not a home gateway, it may determine the home gateway of the RFID/sensor node from the H-GW field of a registration packet transmitted by the RFID/sensor node, and an IP from the registration packet. Then the visiting location information server 226 notifies the home gateway of the RFID/sensor node of the movement of the RFID/sensor node.

As described above, the visiting location information server 226 is used to support the mobility of an RFID/sensor node. That is, the home location information server and the visiting location information server operate in conjunction such that when the RFID/sensor node moves, Mobile IP is affected.

Figure 9:
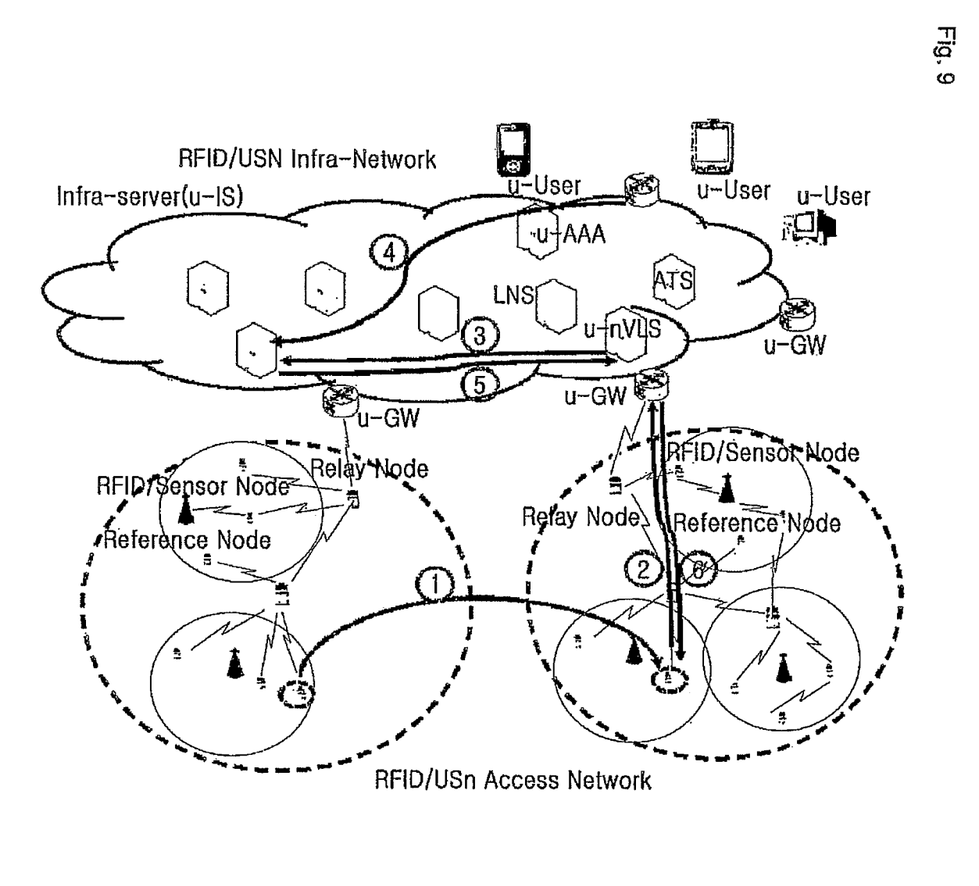
FIG. 9 illustrates an open RFID/USN infrastructure for supporting mobility according to an exemplary embodiment of the present invention.

FIG. 9 illustrates an open RFID/USN infrastructure for supporting mobility according to an exemplary embodiment of the present invention.

According to the present invention, a gateway system for interaction between a sensor network and an IP network includes a gateway for requesting to an RFID/sensor node information including the local ID of the RFID/sensor node and an ID of a home gateway to which the RFID/sensor node initially belonged and registering the node information received from the RFID/sensor node to a location information server, and the location information server for registering and managing the node information about the RFID/sensor node located in the area of the gateway. The location information server has a home location information server for registering and managing node information about an RFID/sensor node for which the gateway is a home gateway and a visiting location information server for registering and managing node information about a visiting RFID/sensor node that has moved to the area of the gateway. Thus the gateway system generates a global ID that the IP network considers to be the address of the RFID/sensor node, using the local ID and the ID of the home gateway.

The present invention may be implemented as a program code that can be written on a computer-readable recording medium and can thus be read by a processor. When the present invention is implemented in software, components of the present invention are code segments that perform a required operation. The program or code segments may be stored in a computer-readable recording medium or transmitted in a computer data signal combined with a carrier in a communication network.

Examples of the computer-readable recording medium include a ROM, a RAM, a CD-ROM, a magnetic tape, a floppy disc, and an optical data storage. The computer-readable recording medium can be distributed over a plurality of computer systems connected to a network so that a computer-readable code is written thereto and executed therefrom in a decentralized manner. Functional programs, code, and code segments needed for realizing the embodiments herein can be construed by one of ordinary skill in the art.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

The invention claimed is:

1. A sensor node management system in a Radio Frequency Identification/Ubiquitous Sensing Network (RFID/USN) infrastructure, comprising:
 a sensor node having a local ID in a sensor network using a non-IP address as the address of the sensor node without being connected to an IP network;
 a gateway for receiving node information from the sensor node, the node information including the local ID and an ID of a home gateway to which the sensor node initially belongs, and registering the node information about the sensor node to a location information server; and
 the location information server for registering and managing node information about sensor nodes within an area of the gateway, wherein the location information server generates a global ID using the non-IP address based local ID and the ID of the home gateway, the global ID being recognized as an address of the sensor node by an Internet Protocol (IP) network,
 wherein the location information server comprises a home location information server for registering and managing node information about a sensor node for which the gateway is a home gateway, and a visiting location information server for registering and managing node information about a visiting sensor node which has moved to the area of the gateway,
 wherein the global ID includes a port count corresponding to the non-IP address of the sensor node in the RFID/USN and an IP address of the home gateway, and
 wherein the location information server is different from the gateway.

2. The sensor node management system of claim 1, wherein if the sensor node is a visiting sensor node that has moved to the area of the gateway, the visiting location information server transmits the node information about the sensor node to a home location information server of the home gateway of the sensor node.

3. The sensor node management system of claim 1, wherein the gateway broadcasts a node information request to sensor nodes in the area of the gateway and the sensor node receives the node information request and transmits the node information to the gateway.

4. The sensor node management system of claim 1, wherein the gateway transmits a data request packet received from a user host of the IP network to the sensor node using the global ID and transmits a sensed data packet received from the sensor node to the user host using the global ID.

5. The sensor node management system of claim 4, wherein when data is transmitted between the sensor node and the IP network, the location information server performs address translation by translating a local ID or global ID of a data packet to a global ID or local ID.

6. The sensor node management system of claim 5, wherein the location information server performs the address translation using an address translation table in which the local ID of the sensor node is mapped to the global ID of the sensor node.

7. The sensor node management system of claim 5, wherein the location information server comprises:
an address translation table manager for updating the address translation table;
an address translator for performing the address translation on the data request packet or the sensed data packet using the address translation table; and
a protocol processor for processing the data request packet or the sensed data packet according to a protocol of the sensor network or the IP network.

8. A gateway system used for interaction between a sensor network and an Internet Protocol (IP) network, comprising:
a gateway for requesting to a sensor node having a local IDentifier (ID) in the sensor network using a non-IP address as the address of the sensor node without being connected to an IP network, node information including the local ID and an ID of a home gateway to which the sensor node initially belongs, and registering the node information about the sensor node to a location information server; and
the location information server for registering and managing node information about sensor nodes within an area of the gateway, and the location information server generates a global ID using the non-IP address based local ID and the ID of the home gateway, the global ID being recognized as an address of the sensor node by the IP network,
wherein the location information server comprises a home location information server for registering and managing node information about a sensor node for which the gateway is a home gateway, and a visiting location information server for registering and managing node information about a visiting sensor node which has moved to the area of the gateway,
wherein the global ID includes a port count corresponding to the non-IP address of the sensor node in the RFID/USN and an IP address of the home gateway, and
wherein the location information server is different from the gateway.

9. A sensor node management method in a Radio Frequency Identification/Ubiquitous Sensing Network (RFID/USN) infrastructure, comprising:
performing node information registration by receiving node information from a sensor node having a local ID in a sensor network using a non-IP address as the address of the sensor node without being connected to an IP network, the node information including the local ID and an ID of a home gateway to which the sensor node initially belongs by a gateway, and registering the node information about the sensor node to a location information server that manages node information about sensor nodes within an area of the gateway by the gateway; and
performing node information management by generating a global ID using the non-IP address based local ID and the ID of the home gateway by the location information server, the global ID being recognized as an address of the sensor node by an Internet Protocol (IP) network,
wherein the location information server comprises a home location information server for registering and managing node information about a sensor node for which the gateway is a home gateway, and a visiting location information server for registering and managing node information about a visiting sensor node which has moved to the area of the gateway,
wherein the global ID includes a port count corresponding to the non-IP address of the sensor node in the RFID/USN and an IP address of the home gateway, and
wherein the location information server is different from the gateway.

10. The sensor node management method of claim 9, wherein the node information registration comprises:
registering the node information to a home location information server that registers and manages node information about a sensor node for which the gateway is a home gateway, if the gateway is a home gateway for the sensor node; and
registering the node information to a visiting location information server that registers and manages node information about a visiting sensor node which has moved to the area of the gateway, if the gateway is not the home gateway for the sensor node.

11. The sensor node management method of claim 10, wherein if the sensor node is a visiting sensor node that has moved to the area of the gateway, the node information registration comprises transmitting the node information about the sensor node to a home location information server of the home gateway of the sensor node by the visiting location information server.

12. The sensor node management method of claim 9, further comprising:
broadcasting a node information request to sensor nodes in the area of the gateway before the node information registration by the gateway; and
transmitting the node information to the gateway, upon receipt of the node information request by the sensor node.

13. The sensor node management method of claim 9, further comprising transmitting a data request packet received from a user host of the IP network to the sensor node using the global ID by the gateway and transmitting a sensed data packet received from the sensor node to the user host using the global ID by the gateway.

14. The sensor node management method of claim 13, wherein the sensed data transmission comprises performing address translation by translating a local ID or global ID of a data packet to a global ID or local ID, when data is transmitted between the sensor node and the IP network.

15. The sensor node management method of claim 14, wherein the address translation comprises performing the address translation using an address translation table in which the local ID of the sensor node is mapped to the global ID of the sensor node.

16. The sensor node management method of claim 14, wherein the sensed data transmission comprises:
updating the address translation table;
performing the address translation on the data request packet or the sensed data packet using the address translation table; and
processing the data request packet or the sensed data packet according to a protocol of the sensor network or the IP network.

17. A non-transitory computer-readable recording medium recording a program for implementing the sensor node management method of claim 9 by a computer.

* * * * *